United States Patent
Robinson et al.

(10) Patent No.: US 10,431,878 B2
(45) Date of Patent: Oct. 1, 2019

(54) WEARABLE DEVICE DESIGN FOR 4G ANTENNAS

(71) Applicant: Verizon Patent and Licensing Inc., Arlington, VA (US)

(72) Inventors: Quentin N. Robinson, Willingsboro, NJ (US); Shamik Basu, Lake Hiawatha, NJ (US); Ai Mitsufuji, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/190,791

(22) Filed: Jun. 23, 2016

(65) Prior Publication Data

US 2017/0373381 A1    Dec. 28, 2017

(51) Int. Cl.
*H01Q 1/27* (2006.01)
*H01Q 1/24* (2006.01)
*G04R 60/12* (2013.01)
*G06F 1/16* (2006.01)
*H01Q 21/30* (2006.01)

(52) U.S. Cl.
CPC ............ *H01Q 1/273* (2013.01); *G04R 60/12* (2013.01); *G06F 1/163* (2013.01); *H01Q 1/243* (2013.01); *H01Q 21/30* (2013.01)

(58) Field of Classification Search
CPC ........ H01Q 1/243; H01Q 1/273; G04R 60/12; G06F 1/163; G06F 1/1654
See application file for complete search history.

(56) References Cited

U.S. PATENT DOCUMENTS

| 5,589,840 | A | * | 12/1996 | Fujisawa | H01Q 1/273 343/718 |
| 7,280,438 | B2 | * | 10/2007 | Fujisawa | G04R 60/12 343/720 |
| 9,196,964 | B2 | * | 11/2015 | Baringer | A61B 5/0002 |
| 9,257,740 | B2 | * | 2/2016 | Lyons | H01Q 1/273 |
| 9,680,514 | B2 | * | 6/2017 | Montgomery | H04B 1/3838 |
| 2007/0091004 | A1 | * | 4/2007 | Puuri | H01Q 1/273 343/718 |
| 2009/0207083 | A1 | * | 8/2009 | Miyazaki | G04G 21/04 343/702 |
| 2009/0305657 | A1 | * | 12/2009 | Someya | H01Q 1/273 455/269 |
| 2011/0051561 | A1 | * | 3/2011 | Fujisawa | G04G 5/002 368/47 |

(Continued)

*Primary Examiner* — Dameon E Levi
*Assistant Examiner* — AB Salam Alkassim, Jr.

(57) ABSTRACT

Techniques described herein may be used to implement a 4G antenna in a wearable device (e.g., a watch) in a manner that optimizes the ability of the antenna to send and receive radio signals while minimizing the user's exposure to radio signals. The antenna may be raised above a base portion and a printed circuit board (PCB) of the wearable device to limit radio signals being absorbed by the user's body, in addition to providing a vertical space between conductive components (such as the PCB), metal nodes to which the PCB is attached, etc.) that might otherwise interfere with radio signals to and from the antenna. The antenna may also be split into two different portions (a first portion and a second portion) in order to limit radio signals from resonating in the antenna for longer than is beneficial.

20 Claims, 9 Drawing Sheets

(56) References Cited

U.S. PATENT DOCUMENTS

| | | | |
|---|---|---|---|
| 2012/0122519 A1* | 5/2012 | Jochheim | H04B 1/385 455/556.1 |
| 2014/0225786 A1* | 8/2014 | Lyons | H01Q 1/273 343/702 |
| 2014/0253393 A1* | 9/2014 | Nissinen | H01Q 1/36 343/702 |
| 2014/0253394 A1* | 9/2014 | Nissinen | H01Q 7/00 343/702 |
| 2014/0285385 A1* | 9/2014 | Aoki | H01Q 1/243 343/702 |
| 2014/0354494 A1* | 12/2014 | Katz | H01Q 1/273 343/718 |
| 2015/0070226 A1* | 3/2015 | Wong | H01Q 1/273 343/718 |
| 2015/0130666 A1* | 5/2015 | Pan | H02J 7/0045 343/702 |
| 2015/0309535 A1* | 10/2015 | Connor | G06F 1/163 361/679.03 |
| 2015/0311960 A1* | 10/2015 | Samardzija | G06F 1/163 455/90.3 |
| 2016/0006109 A1* | 1/2016 | Apaydin | H01Q 5/328 343/702 |
| 2016/0036120 A1* | 2/2016 | Sepanniitty | H01Q 1/243 343/702 |
| 2016/0056533 A1* | 2/2016 | Nissinen | H01Q 9/0421 343/702 |
| 2016/0063232 A1* | 3/2016 | Seol | G06F 3/03547 726/19 |
| 2016/0064804 A1* | 3/2016 | Kim | H01Q 1/243 343/702 |
| 2016/0088131 A1* | 3/2016 | Chiu | H04M 1/026 455/575.8 |
| 2016/0118713 A1* | 4/2016 | Hong | H01Q 25/001 343/702 |
| 2016/0187857 A1* | 6/2016 | Cho | G04R 20/00 368/47 |
| 2016/0254587 A1* | 9/2016 | Jung | H01Q 1/273 343/702 |
| 2016/0255733 A1* | 9/2016 | Jung | G06F 1/1633 361/759 |
| 2016/0294038 A1* | 10/2016 | Lo | H01Q 1/48 |
| 2016/0313769 A1* | 10/2016 | Yoshitani | G06F 3/167 |
| 2017/0025747 A1* | 1/2017 | Vanjani | H01Q 1/273 |
| 2017/0045916 A1* | 2/2017 | Kim | G04G 17/045 |
| 2017/0117093 A1* | 4/2017 | Kim | G06F 1/163 |
| 2017/0133752 A1* | 5/2017 | Choi | H01Q 5/50 |
| 2017/0141459 A1* | 5/2017 | Liou | H01Q 1/273 |
| 2017/0179580 A1* | 6/2017 | Park | H01Q 5/30 |
| 2017/0179581 A1* | 6/2017 | Puuri | H01Q 1/273 |
| 2017/0187096 A1* | 6/2017 | Hwang | H01Q 1/273 |
| 2017/0199497 A1* | 7/2017 | Kuo | G04R 60/10 |
| 2017/0365916 A1* | 12/2017 | Wu | H01Q 5/30 |
| 2018/0006364 A1* | 1/2018 | Wu | H01Q 5/30 |
| 2018/0062245 A1* | 3/2018 | Wu | H01Q 9/28 |
| 2018/0062275 A1* | 3/2018 | Kim | H01Q 1/273 |
| 2018/0069300 A1* | 3/2018 | Choi | G04G 9/0064 |
| 2018/0083342 A1* | 3/2018 | Lepe | H01Q 1/243 |
| 2018/0090975 A1* | 3/2018 | Lee | H01Q 1/273 |
| 2018/0102588 A1* | 4/2018 | Szini | H01Q 1/241 |
| 2018/0128924 A1* | 5/2018 | Wu | G01S 19/14 |
| 2018/0129170 A1* | 5/2018 | Yun | H01Q 5/364 |

\* cited by examiner

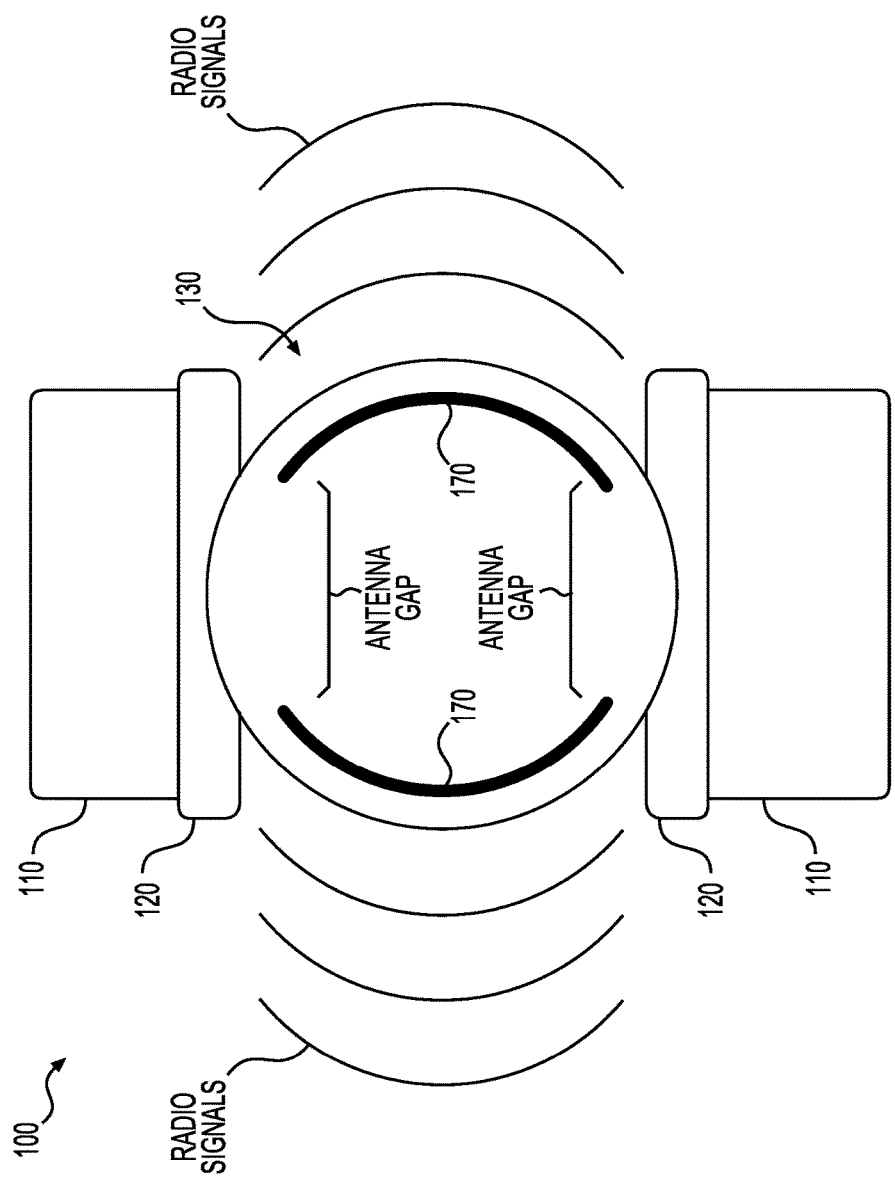

WEARABLE DEVICE DESIGN FOR 4G ANTENNAS

BACKGROUND

A wearable device may include a device that may be worn by a user, such as a watch, a fitness band, a necklace, glasses, an eyeglass, a ring, a belt, or a headset, that also includes computation and communication functions. One example of a wearable device is a "smart" watch. Wearable devices frequently include the ability to communicate, via radio communications, with another device (e.g., with a smartphone or other device carried by a user) or with a network. In this case, the wearable device will include an integrated antenna.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIGS. 1A and 1B illustrate an example overview of an implementation described herein;

DETAILED DESCRIPTION OF PREFERRED EMBODIMENTS

Figure 1A:
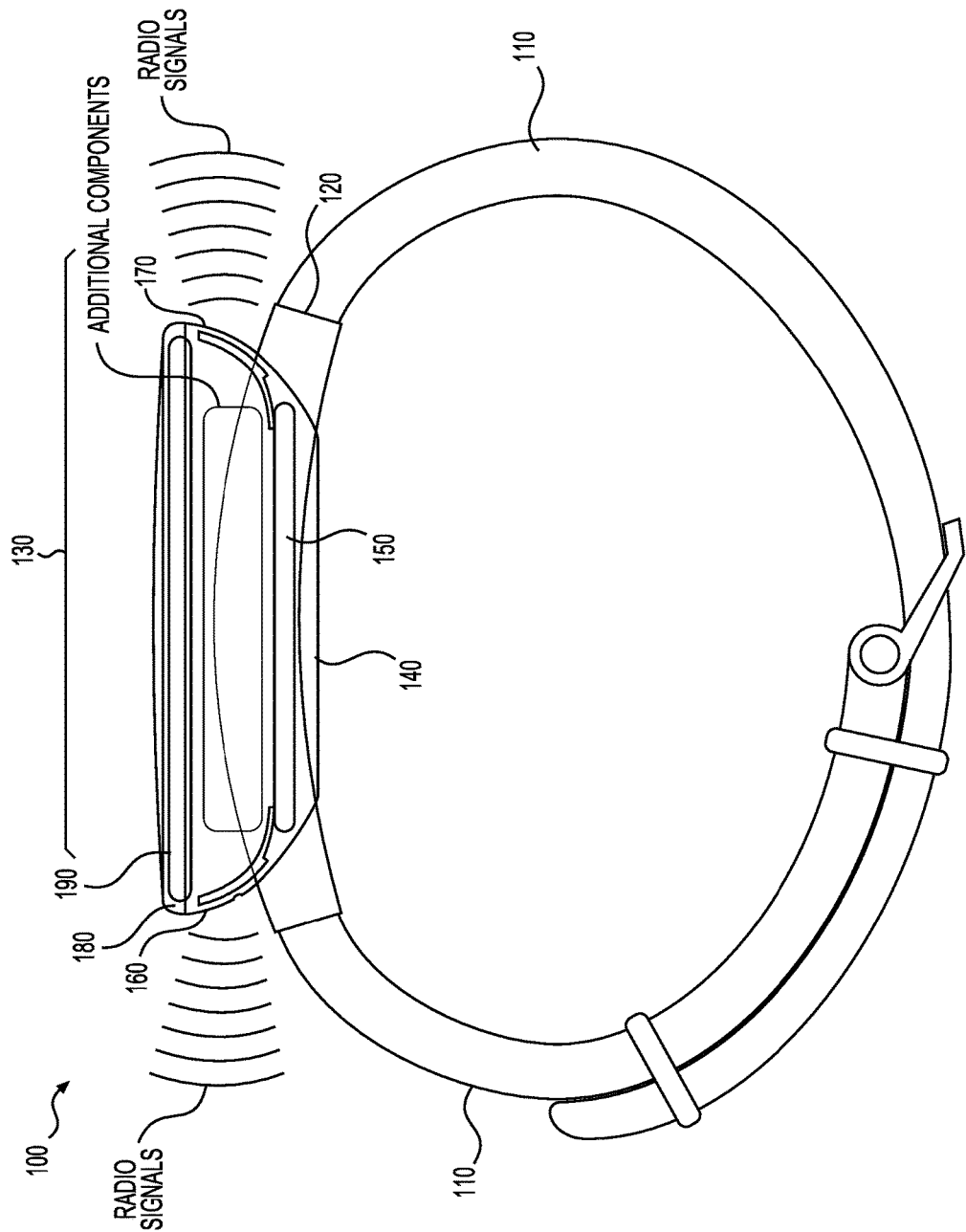

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Wearable devices are described herein that include one or more antennas for communicating with a Radio Access Network (RAN) of a cellular wireless telecommunication network. The wearable devices may be User Equipment (UE) devices for the cellular network. Due to the limited size of some wearable devices (e.g., watches), wearable devices are often restricted to using smaller antennas, such as Bluetooth antennas, WiFi antennas, 2nd Generation (2G) antennas, or 3rd Generation (3G) antennas, which are typically less than two inches in length. Larger antennas, such as 4th Generation (4G) antennas, may be much longer and, therefore, more difficult to include (inconspicuously) in wearable devices.

Some wearable devices may include larger antennas (e.g., 4G antennas). However, the manner in which such antennas may be included may limit the ability of the antennas to send and receive radio signals. For example, when a 4G antenna is included in a watch, the antenna is typically inserted into a wristband of the watch because only the wristband is long enough to house the 4G antenna and the wristband, being made of leather (as opposed to metal), might not interfere as much with the 4G antenna's ability to send and receive radio signals. However, including a 4G antenna in a wristband of the watch may limit the 4G antennas ability to send and receive signals due to radio signals being interfered with by a user's body (i.e., the wrist). In addition, due to health concerns of some users with respect to exposing the body to radio signals, positioning the 4G antennas against the skin (via the wristband of a watch) may be unappealing to some potential users.

Techniques described herein may be used to implement a 4G antenna in a wearable device (e.g., a watch) in a manner that optimizes the ability of the antenna to send and receive radio signals while minimizing the wearer's exposure to radio signals. For example, a 4G antenna may be separated into two portions that are positioned inside of a core portion of the watch (i.e., the portion of the watch that includes the digital display). The two portions of the antenna may be located along an outer wall of the core portion of the watch to account for the overall length of the 4G antenna and to still provide ample space for the other components of the watch (e.g., the digital display, a printed circuit board (PCB), etc.). The outer wall may be made of a material (such as a plastic) that does not interfere with radio signals. Additionally, the 4G antenna may be raised above a base portion of the core portion of the watch to limit radio signals being absorbed by the wearer's body, in addition to providing vertical spacing between metal components (such as the PCB, features to which the PCB is attached, etc.) that might otherwise interfere with the antenna's ability to send and receive radio signals.

While one or more of the techniques, described herein, may be presented in an implementation involving a watch; the techniques may also be applied to other types of wearable devices, such as necklaces, glasses, belts, headsets, etc. Additionally, while some of the techniques, described herein, may be presented in an implementation involving a 4G antenna, some of the techniques may also, or alternatively, be applied to wearable devices with other types of antennas (e.g., 3G antennas, 5G antennas, etc.). Furthermore, while some of the techniques described herein, may be described in terms of the physical features of wearable devices, the scope of the techniques may include the use of such wearable devices (e.g., putting on a 4G enabled watch and causing the watch (e.g., by powering the watch on) to communicate with a wireless telecommunication network). Additionally, "4G antenna," as used herein, may include an antenna that meets, or exceeds, the physical dimensions (e.g., the length) of a standard 4G antenna.

FIGS. 1A and 1B illustrate an example overview of an implementation described herein. FIG. 1A illustrates a side view of a 4G enable watch, and FIG. 1B illustrates a top down view of the 4G enabled watch. As shown, watch 100 may include wristband 110, connector portion 120, and watch core 130. Wristband 110 may be used to attach and remove watch 100 from a wrist of a wearer, and connector portion 120 may secure wristband 110 to watch core 130. In some implementations, watch 100 may be attached to another body part of the wearer (e.g., an ankle).

Watch core 130 may include bottom cover 140, a PCB 150, outer wall 160, 4G antenna 170, bezel 180, and display 190. The components (e.g., bottom cover 140, PCB 150, etc.) of watch core 130 are provided for explanatory purposes only. In practice, watch core 130 may include additional components, fewer components, different components, or differently arranged components than the components illustrated in FIGS. 1A and 1B. For example, while not shown, watch core 130 may include additional components, such as a power source (e.g., a battery), display circuitry (e.g., a liquid crystal display (LCD) screen, and other types of components). As shown, such components may be positioned between the antenna portions of 4G antenna 170.

Bottom cover 140, outer wall 160, bezel 180, and display 190 may provide a housing for watch components to be disposed therein (e.g., PCB 150, 4G antenna 170, etc.). PCB 150 may include circuitry (hardware, software, or a combination thereof) that enables watch 100 to perform one or more operations. Examples of such operations may include storing data, executing logical instructions, providing and/or receiving information from a wearer (via a display portion), communicating with a network (via the 4G antenna), and more.

4G antenna 170 may be separated into two antenna portions that are disposed along an inner circumference of the outer wall. Separating the 4G antenna into two portions may enhance performance by ensuring that radio signals that are sent or received by 4G antenna 170 do not continue to resonate throughout 4G antenna 170 after the radio signals have been sent or received. Additionally, 4G antenna 170 may be vertically separated from bottom cover 140 and PCB 150 to better ensure that radio signals that are sent or received by 4G antenna 170 are not absorbed by the body of the wearer. The positioning of 4G antenna 170 may also help ensure that, for example, components that may be metallic, such as PCB 150 and/or connector portion 120, do not interfere with the radio signals that are sent to, or received by, 4G antenna 170. The outer wall may be made of plastic or another type of material that has a limited impact on the ability of 4G antenna 170 to send and receive radio signals. As shown, the design and positioning of the antenna portions of 4G antenna 170 may create antenna gaps separating the antenna portion from each other. The antenna gaps may improve performance of 4G antenna 170 by helping to ensure that radio signals that are sent or received by 4G antenna 170 to not continue resonating throughout 4G antenna after the signals are sent/received by 4G antenna 170. While 4G antenna 170 is illustrated in FIG. 1B as consisting of two antenna parts, in some implementations, 4G antenna 170 may only be a single 4G antenna. The single 4G antenna may be similar in length to the combined length of the two antenna parts illustrated in FIG. 1B.

Figure 2:
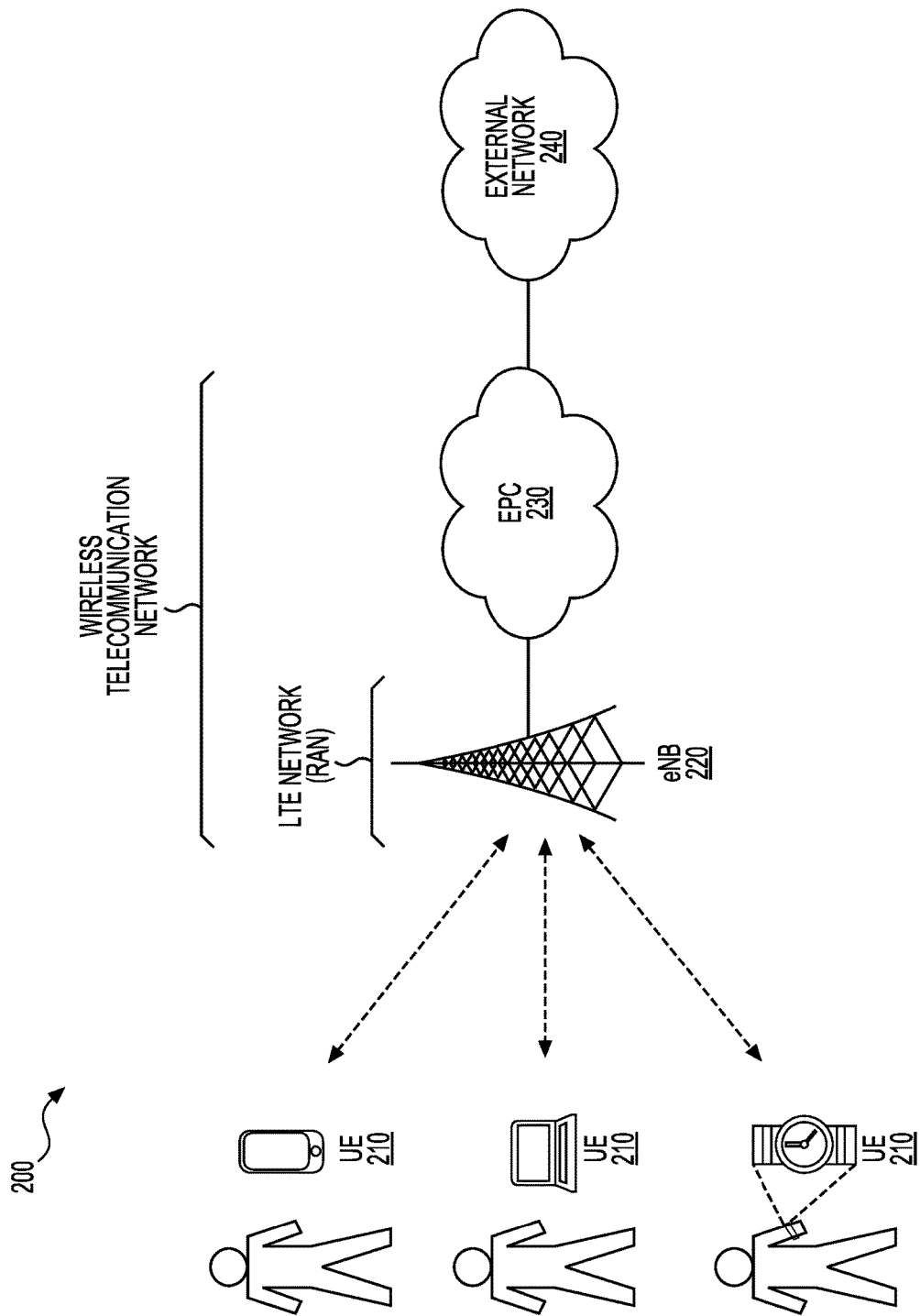
FIG. 2 illustrates a diagram of an example environment in which systems and/or methods described herein may be implemented.

FIG. 2 is a diagram of an example environment 200 in which systems and/or methods described herein may be implemented. Environment 200 may include UEs 210, a wireless telecommunication network, and external network 240. The wireless telecommunication network may include an Evolved Packet System (EPS) that includes a Long-Term Evolution (LTE) network and/or evolved packet core (EPC) network 230 that operates based on a 3rd Generation Partnership Project (3GPP) wireless communication standard. The LTE network may be, or may include, radio access networks (RANs) that include one or more base stations, some or all of which may take the form of evolved Node Bs (eNBs) 220, via which UEs 210 may communicate with EPC network 230.

UE 210 may include a portable computing and communication device, such as a personal digital assistant (PDA), a smart phone, a cellular phone, a laptop computer with connectivity to a cellular wireless network, a wearable device, a tablet computer, etc. UE 210 may also include a non-portable computing device, such as a desktop computer, a consumer or business appliance, or another device that has the ability to connect to the wireless telecommunication network. UE 210 may also include a computing and communication device that may be worn by a user (also referred to as a "wearable device"), such as a watch, a fitness band, a necklace, glasses, an eyeglass, a ring, a belt, a headset, or another type of wearable device. UE 210 may wirelessly communicate with the wireless telecommunication network via eNB 220.

eNB 220 may include one or more network devices that receive, process, and/or transmit traffic, such as calls, audio, video, text, television programming content, and/or other data, destined for and/or received from UE 210 (e.g., via an air interface). eNB 220 may be connected to a network device, such as site router, that functions as an intermediary for information communicated between eNB 220 and EPC network 230.

EPC network 230 may include various network devices that may operate in accordance with a particular communication standard. Examples of such network devices may include a Serving Gateway (SGW), a Packet Data Network (PDN) Gateway (PGW), and a Mobility Management Entity (MME). EPC network 230 may operate in accordance with a particular communication standard, such as the 3GPP communication standard. As shown, the EPC network may enable UEs 210 to communicate with external network 240, which may include a Public Land Mobile Network (PLMN), a Public Switched Telephone Network (PSTN), an Internet Protocol (IP) network (e.g., the Internet), and/or another type of network.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environment 200. Additionally, the devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections may be shown between certain devices in FIG. 2, some of said devices may, in practice, communicate with each other via one or more additional devices and/or networks.

Figure 3:
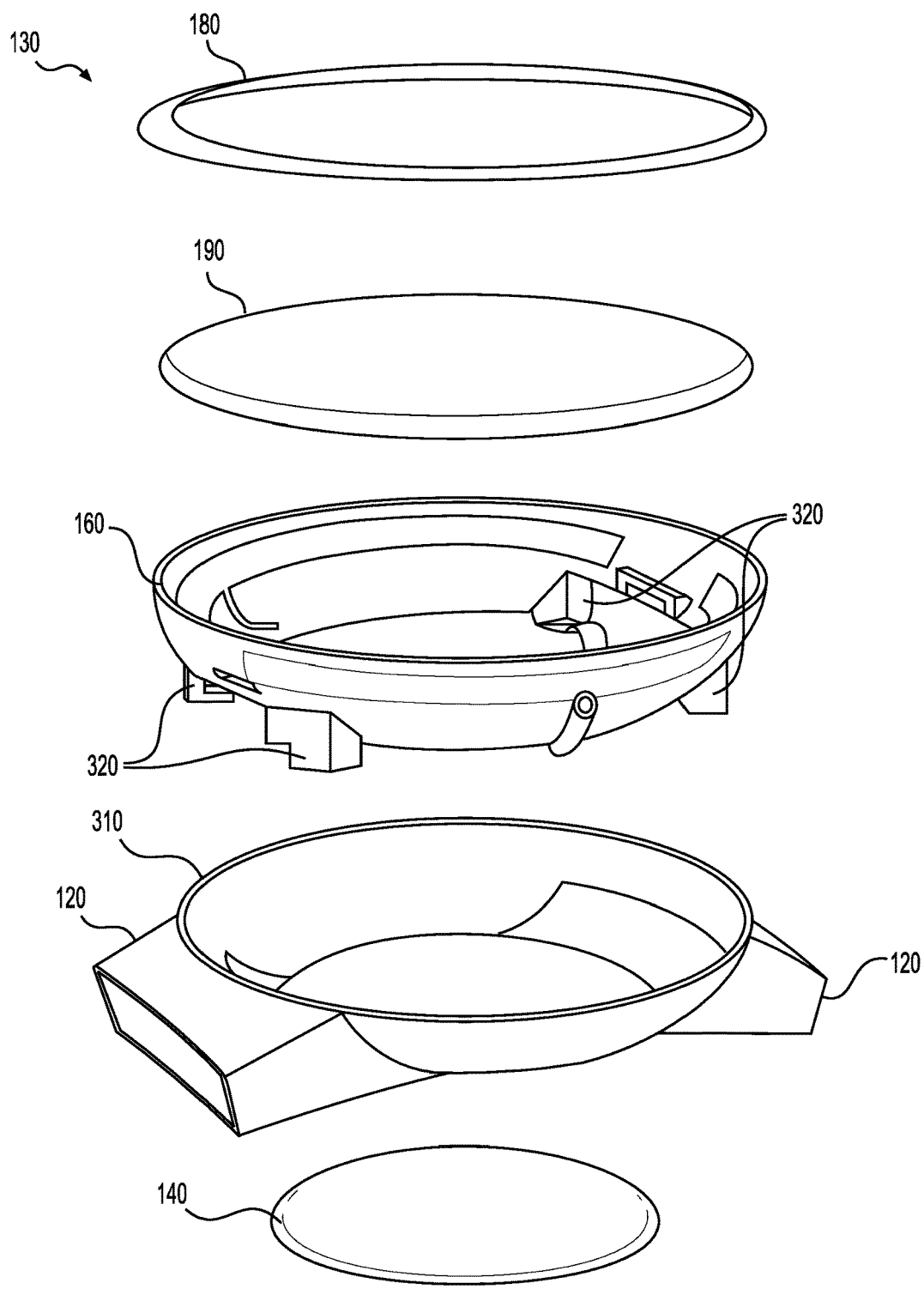
FIG. 3 illustrates an expanded view of example components of a watch core.

FIG. 3 illustrates an expanded view of example components of watch core 130. As shown, the example components of watch core 130 may include bottom cover 140, connector portions 120, outer wall 160, display 190, and bezel 180. Each of the example components of FIG. 3 may be made of one or more materials, such as metal, plastic, carbon composite, glass, fiberglass, etc. Additionally, the components shown in FIG. 3 are provided for explanatory purposes only. In practice, watch core 130 may include additional components, fewer components, different components, or differently arranged components than the components illustrated in FIG. 3.

Base cover 140 may include a bottom most component that may abut against a wearer's wrist when watch 100 is worn. Connector portions 120 may include a component capable of physically coupling wristband 110 to watch core 130. As shown in FIG. 3, connector portions 120 may include a holding component 310 that may couple each connector portion 120 to one another. Holding component 310 may also be designed to receive bottom cover 140 on a bottom portion thereof, and outer wall 160 on an upper portion thereof. In some implementations, when coupled with outer wall 160, the upper portion of holding component 310 may be flush with outer wall 160. In some implementations, connector portions 120 may not include holding component 310. In such implementations, connector portions 120 may instead be attached directly to outer wall 160.

Outer wall 160 may include a housing for a 4G antenna 170. Outer wall 160 may couple with base cover 140 and/or holding component 310 in such a manner as to create a vertical space between base cover 140 and/or PCB 150 (which may be positioned on top of base cover 140). For example, outer wall 160 may include base nodes 320 on a bottom side thereof, which may ensure that a vertical space exists between base cover 140 and/or PCB 150 when watch core 130 is assembled.

Display 190 may include an upper most (or top most) component of watch 100, which may vertically abut against outer wall 160. Display 190 may include a transparent material (e.g., glass) that may permit a wearer to view information (e.g., a time, a date, etc.) presented to the wearer. Display 190 may also, or alternatively, include circuitry to display information to a user of watch 100 and/or to receive information from the user (e.g., via a touch-sensitive interface, one or more buttons, etc.). Bezel 180 may couple with display 190 and/or outer wall 160 in order to secure display 190 to outer wall 160.

Figure 4:
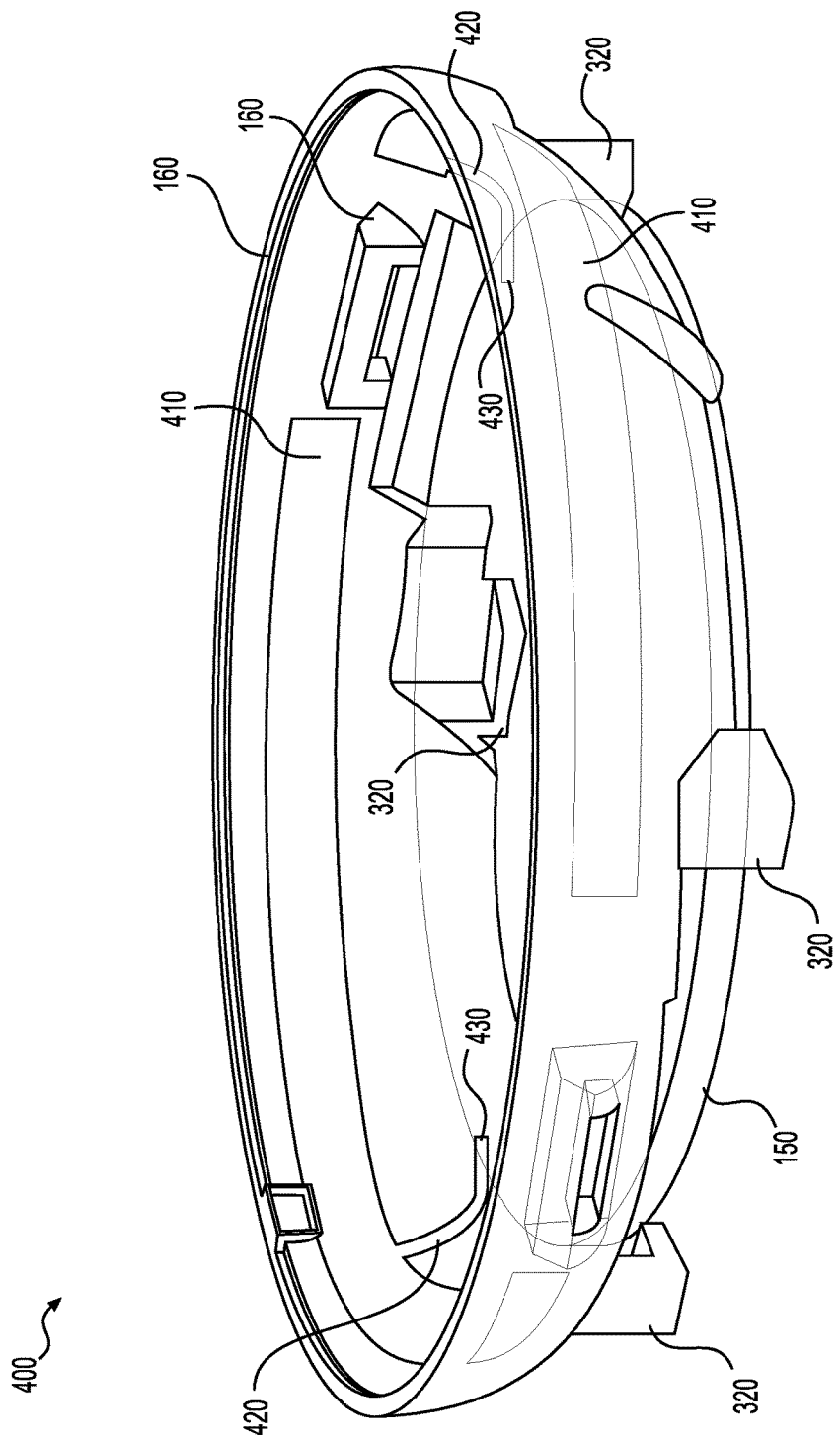
FIG. 4 illustrates an example bottom portion of a watch core.

FIG. 4 illustrates an example bottom portion 400 of watch core 130. As shown, example bottom portion 400 may include PCB 150 and outer wall 160. Outer wall 160 may include areas 410 where 4G antenna 170 may be positioned, areas 420 where electrode features may extend from 4G antenna 170, and connection points 430 where the electrode features may connected with PCB 150. As shown, the electrode features may include circuitry to enable 4G antenna 170 to be functionally connected to PCB 150 and still remain vertically spaced from bottom cover 140, PCB 150, and/or base nodes 320. Additionally, as shown in FIG. 4, the areas 410 for 4G antenna 170 may be separated from one another (by, for example, connector portions 160). In some implementations, separating the portions of 4G antenna 170 in such a manner may reduce the chance that a radio signal will continue resonating throughout 4G antenna 170 after the radio signal has been sent or received by 4G antenna 170.

Figure 5:
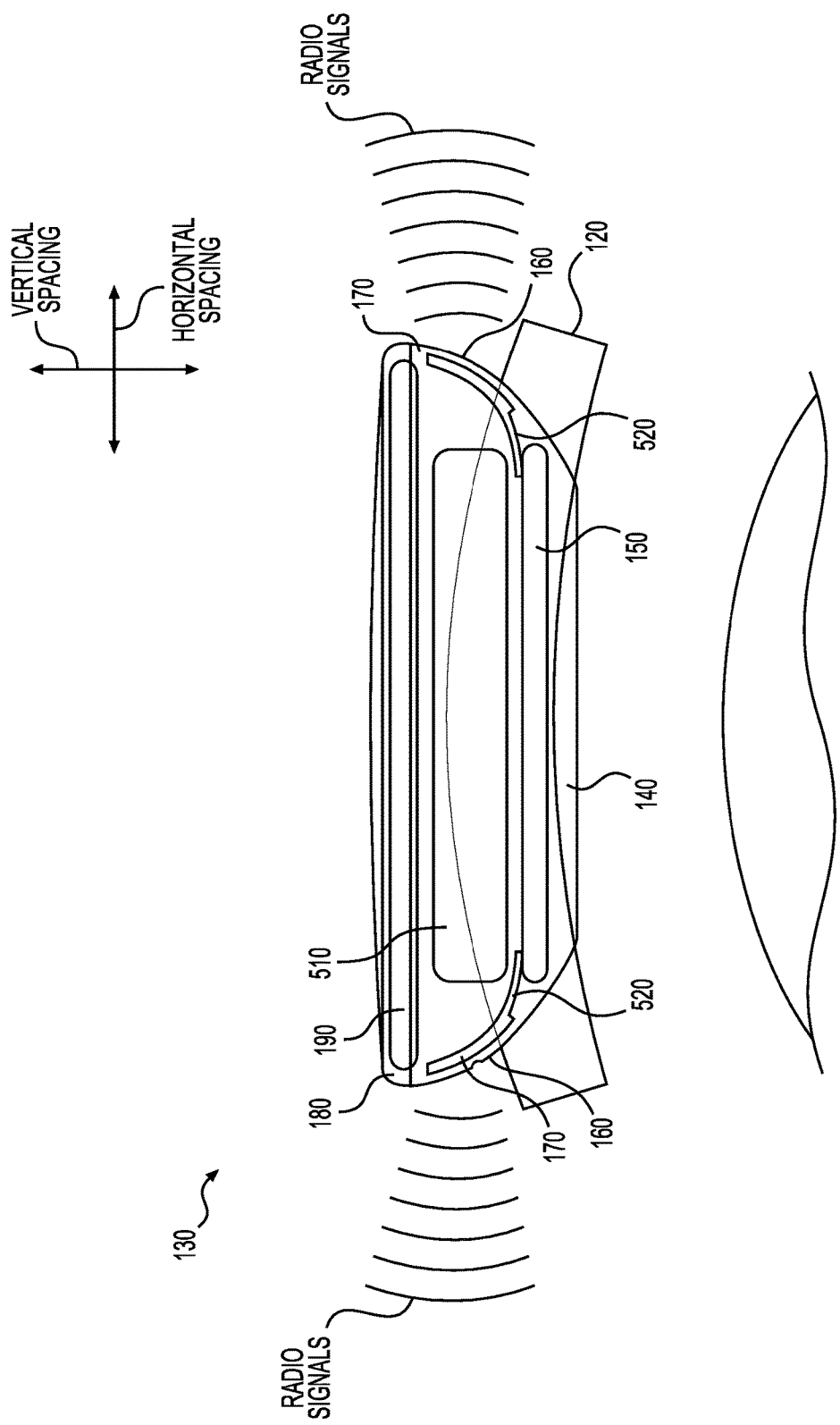
FIG. 5 illustrates a side view of an example watch core.

FIG. 5 illustrates a side view of an example watch core 130. As shown, watch core 130 may include bottom cover 140, PCB 150, outer wall 160, 4G antenna 170, bezel 180, and display 190. Watch core 130 may also include additional components 510, such as a battery, an electronic interface that displays information to the wearer, etc. As shown in FIG. 5, additional components 510 may be positioned, within watch core 130, on the same vertical height (or plane) as 4G antenna 170.

Bottom cover 140, outer wall 160, bezel 180, and display 190 may provide a housing for watch components to be disposed therein (e.g., PCB 150, 4G antenna 170, etc.). Bottom cover 140 may provide a foundation for securing PCB 150 to a bottom most portion of watch core 130. 4G antenna 170 may be separated into two antenna portions that are disposed along a circumference of the outer wall. Separating the 4G antenna into two antenna portions may create a horizontal space or gap (referred to above, in FIG. 1B, as an antenna gap) between the two antenna portions.

Additionally, 4G antenna 170 may be vertically separated from bottom cover 140 and PCB 150 to create a vertical spacing there between. The vertical spacing may help ensure that 4G antenna 170 may send and receive radio signals before they are interfered with by the body of the wearer. The vertical spacing may also help ensure that, for example, metallic components, such as PCB 150 and/or connector portion 120, do not interfere with 4G antenna 170. The vertical spacing may be traversed by electrode features 520 that may provide an electrical connection between PCB and each portion of 4G antenna 170.

Figure 6:
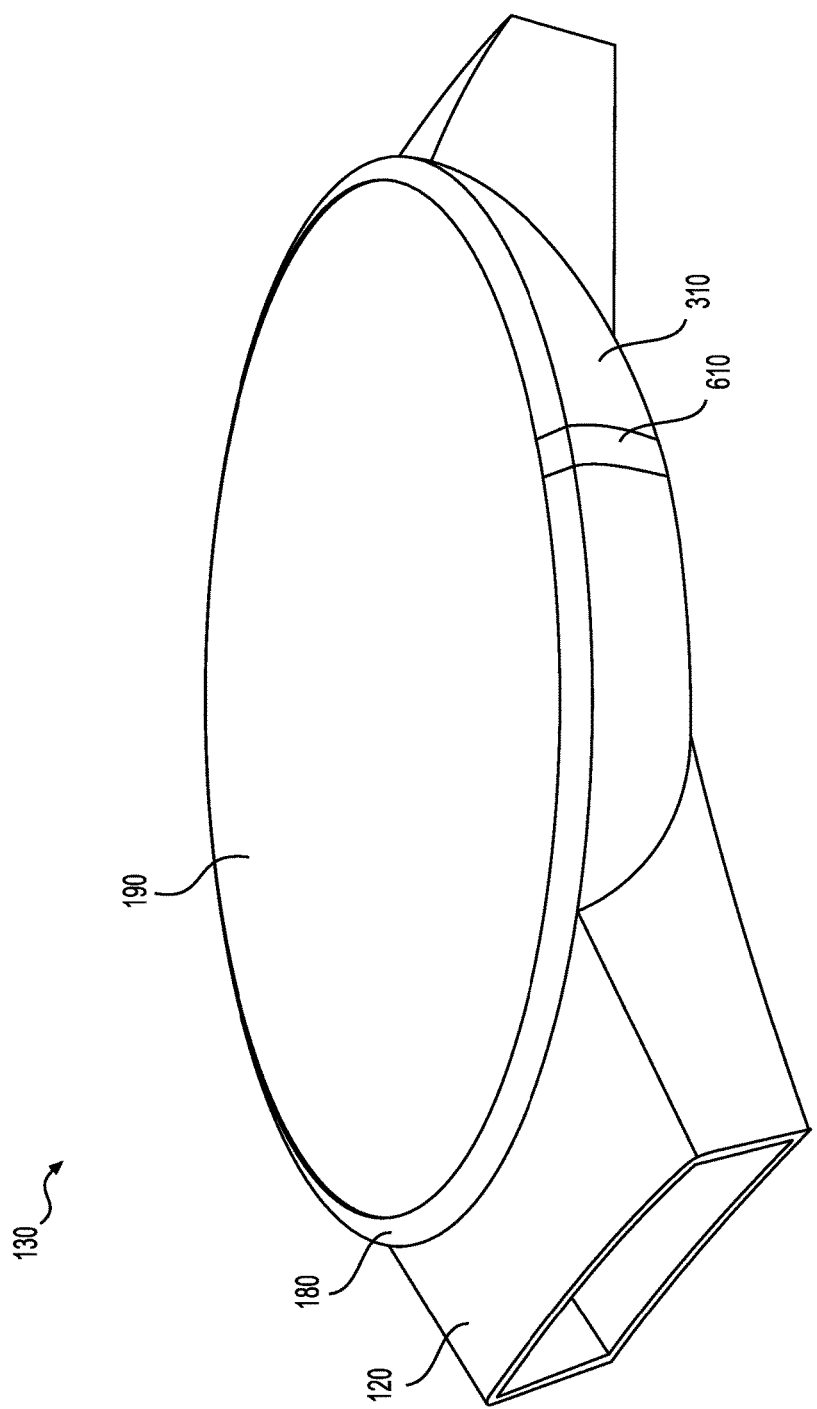
FIG. 6 illustrates a perspective view of an example watch core with a gap feature.

FIG. 6 illustrates a perspective view of example watch core 130 with gap feature 610. Many of the features illustrated in FIG. 6 are described above (e.g., connector portion 120, bezel 180, holding component 310, etc.). As shown, watch core 130 may also include gap feature 610. Gap feature 610 may include a section of bezel 180 and holding component 310. Whereas bezel 180 and holding component 310 may be made of metal, gap feature 610 may be made of plastic or another type of material that has a limited impact on the ability of 4G antenna 170 to send and receive radio signals. As such, including gap feature 610 in watch core 130 may enhance the ability of 4G antenna 170 to send and receive information wirelessly.

Figure 7:
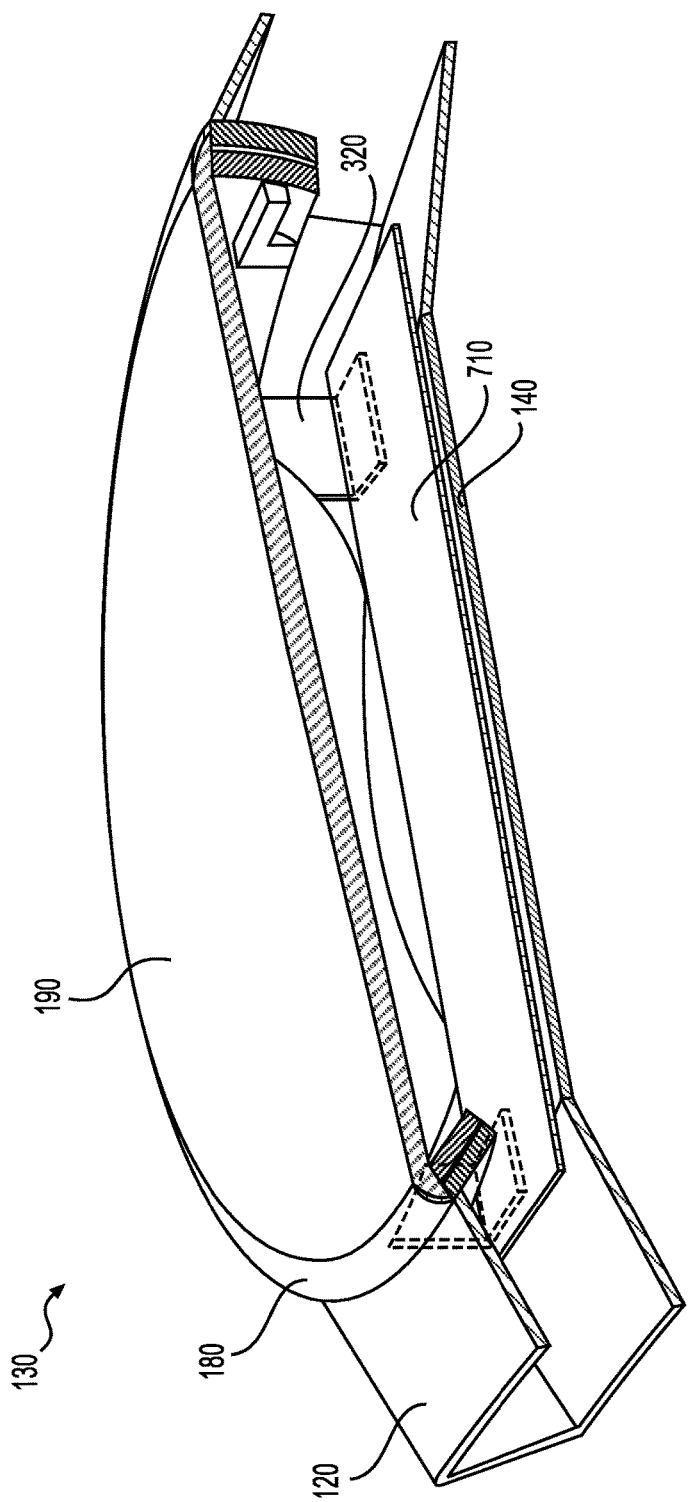
FIG. 7 illustrates a cross section view of an example watch core with an extended printed circuit board (PCB)

FIG. 7 illustrates a cross section view of example watch core 130 with an extended printed circuit board (PCB) 710. Many of the features illustrated in FIG. 6 are described above (e.g., connector portion 120, bezel 180, bottom cover 140, etc.). As shown, watch core 130 may also include extended PCB 710. Extended PCB 710 may be coupled with base nodes 320 and may extend beyond bottom cover 140 into connector portions 120. The extended PCB may (for example) increase the available surface area of the PCB in watch core 130 and, therefore, enable watch core 130 to have greater computing componentry and capabilities (e.g., greater processing power, more memory capacity, etc.).

Figure 8:
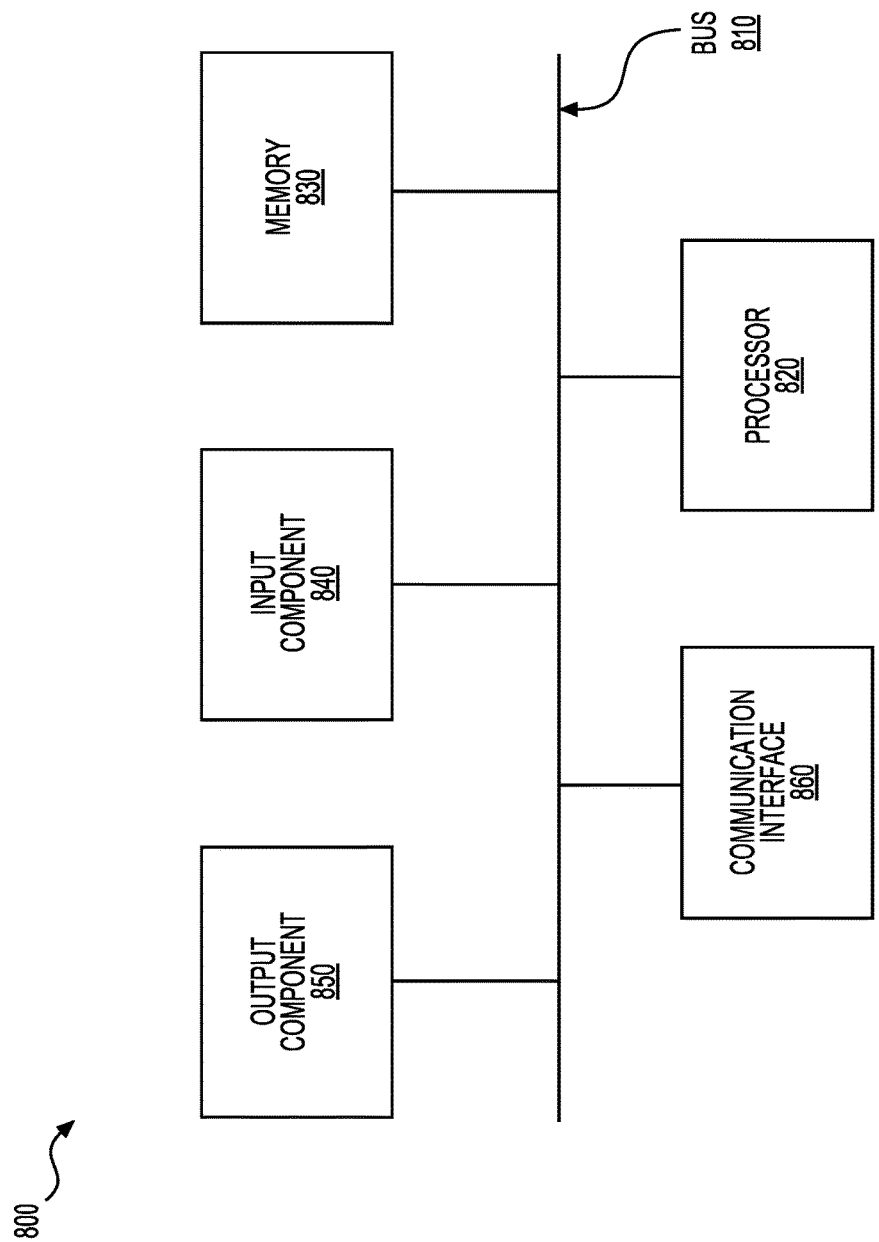
FIG. 8 illustrates a diagram of example components of a device.

FIG. 8 is a diagram of example components of a device 800 Each of the devices illustrated in FIGS. 1A, 1B, 2, and 5 may include one or more devices 800. Device 800 may include bus 810, processor 820, memory 830, input component 840, output component 850, and communication interface 860. In another implementation, device 800 may include additional, fewer, different, or differently arranged components. As described herein, a component may be implemented by hardware circuitry, software logic, and/or some combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software. As used herein, the term "circuitry" may include hardware, software, or a combination thereof.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A wearable device, comprising:
    an outer wall defining a circumference of an inner core portion of the wearable device, wherein a first portion of the outer wall includes a first material and a second portion of the outer wall includes a second material that is different from the first material;
    a bottom cover, coupled to a bottom portion of the outer wall, defining a bottom most portion of the inner core portion of the wearable device;
    a bezel, coupled to a top portion of the outer wall, defining a top portion of the inner core portion of the wearable device, wherein a first portion of the bezel includes the first material, wherein the first portion of the bezel and the first portion of the outer wall form a contiguous gap feature that includes the first material;
    a connector portion coupled to an outer edge of the outer wall, wherein the outer wall includes an opening proximate to the connector portion, such that the connector portion and the outer wall include a contiguous space;
    a printed circuit board (PCB), coupled to the bottom cover by one or more metal nodes such that a first vertical space is formed between the PCB and the bottom cover, wherein the PCB comprises circuitry to enable the wearable device to communicate with a wireless telecommunication network,
        wherein the PCB extends through the opening and is situated partially within the connector portion; and
    an antenna, through which the PCB communicates with the wireless telecommunications network, wherein the antenna is positioned along a circumference of an inner portion of the outer wall and above the PCB to create a second vertical space between the antenna and the PCB, wherein the antenna includes a first antenna portion and a second antenna portion that are arranged separately along the circumference of the outer wall such that a gap exists between the first antenna portion and the second antenna portion, and wherein the first antenna portion and the second antenna portion are positioned within the inner core portion, below the bezel and not in contact with the bezel, and above the bottom cover.

2. The wearable device of claim 1, wherein the inner core portion comprises at least one electrode portion for connecting the antenna to the PCB, the at least one electrode portion traversing the vertical space between the antenna and the PCB.

3. The wearable device of claim 1, wherein the antenna is positioned along the circumference of the inner portion of the outer wall, such that when the wearable device is secured to a wrist of a wearer, radio signals emanating from the antenna are propagated on a plane that is above the wrist of the wearer and in a manner that is parallel to a length of the wrist of the wearer.

4. The wearable device of claim 1, wherein the connector portion is a first connector portion, the wearable device further comprising:
 a wristband to enable a wearer to removably attach the wearable device to a wrist of the wearer; and
 a second connector portion, wherein the first and second connector portions are positioned on opposing sides of the inner core portion of the wearable device, to attach the wristband to the wearable device.

5. The wearable device of claim 4, wherein the antenna is positioned along the circumference of the inner portion of the outer wall, such that radio signals emanating from the antenna propagate along a plane that is above the wristband of the wearable device and in a manner that is perpendicular to a length of the wristband.

6. The wearable device of claim 1, wherein:
 the antenna is positioned along the circumference of the inner portion of the outer wall to create a third vertical space between the antenna and the metal nodes.

7. The wearable device of claim 1, wherein the inner core portion of the wearable device further includes a battery to provide power to the PCB and the antenna, the battery being positioned within the inner core portion of the wearable device on a same vertical plane as the antenna.

8. The wearable device of claim 1, wherein the inner core portion of the wearable device further includes an electronic interface to provide information to, and receive information from, a wearer of the wearable device, the electronic interface being positioned within the inner core portion of the wearable device on a same vertical plane as the antenna.

9. The wearable device of claim 1, wherein the inner core portion of the wearable device further includes a display cover, coupled to a top most portion of the outer wall, defining a top most portion of the inner core portion of the wearable device.

10. A method, comprising:
 providing a wearable device, wherein the wearable device comprises:
  an outer wall defining a circumference of an inner core portion of the wearable device, wherein a first portion of the outer wall includes a first material and a second portion of the outer wall includes a second material that is different from the first material;
  a bottom cover, coupled to a bottom portion of the outer wall, defining a bottom most portion of the inner core portion of the wearable device;
  a bezel, coupled to a top portion of the outer wall, defining a top portion of the inner core portion of the wearable device, wherein a first portion of the bezel includes the first material, wherein the first portion of the bezel and the first portion of the outer wall form a contiguous gap feature that includes the first material;
  a connector portion coupled to an outer edge of the outer wall, wherein the outer wall includes an opening proximate to the connector portion, such that the connector portion and the outer wall include a contiguous space;
  a printed circuit board (PCB), coupled to the bottom cover by one or more metal nodes such that a first vertical space is formed between the PCB and the bottom cover,
   wherein the PCB comprises circuitry to enable the wearable device to communicate with a wireless telecommunication network,
   wherein the PCB extends through the opening and is situated partially within the connector portion; and
  an antenna, through which the PCB communicates with the wireless telecommunications network,
   wherein the antenna is positioned along a circumference of an inner portion of the outer wall and above the PCB to create a second vertical space between the antenna and the PCB,
   wherein the antenna includes a first antenna portion and a second antenna portion that are arranged separately along the circumference of the outer wall such that a gap exists between the first antenna portion and the second antenna portion, and
   wherein the first antenna portion and the second antenna portion are positioned within the inner core portion, below the bezel and not in contact with the bezel, and above the bottom cover; and
 communicating with the wearable device via the antenna.

11. The method of claim 10, wherein the antenna is positioned along the circumference of the inner portion of the outer wall, such that when the wearable device is secured to a wrist of a wearer, radio signals emanating from the antenna propagate along a plane that is above the wrist of the wearer and in a manner that is parallel to a length of the wrist of the wearer.

12. The method of claim 10, wherein the connector portion is a first connector portion, wherein the wearable device further comprises:
 a wristband to enable a wearer to removably attach the wearable device to a wrist of a wearer; and
 a second connector portion, wherein the first and second connector portions are positioned on opposing sides of the inner core portion of the wearable device, to attach the wristband to the wearable device.

13. The method of claim 12, wherein the antenna is positioned along the circumference of the inner portion of the outer wall, such that radio signals emanating from the antenna propagate along a plane that is above the wristband of the wearable device and in a manner that is perpendicular to a length of the wristband.

14. The method of claim 10, wherein:
 the antenna is positioned along the circumference of the inner portion of the outer wall to create a third vertical space between the antenna and the metal nodes.

15. The method of claim 10, wherein the inner core portion of the wearable device further includes a battery to provide power to the PCB and the antenna, the battery being positioned within the inner core portion of the wearable device on a same vertical plane as the antenna.

16. The method of claim 10, wherein the inner core portion of the wearable device further includes an electronic interface to provide information to, and receive information from, the wearer of the wearable device, the electronic interface being positioned within the wearable device core on a same vertical plane as the antenna.

17. The method of claim 10, wherein the inner core portion of the wearable device further includes a display cover, coupled to a top most portion of the outer wall, defining a top most portion of the wearable device core.

18. An apparatus, comprising:
  an outer wall defining a circumference of an inner core portion of the apparatus, wherein a first portion of the outer wall includes a first material and a second portion of the outer wall includes a second material that is different from the first material;
  a bottom cover, coupled to a bottom portion of the outer wall;
  a bezel, coupled to a top portion of the outer wall, defining a top portion of the inner core portion, wherein a first portion of the bezel includes the first material, wherein the first portion of the bezel and the first portion of the outer wall form a contiguous gap feature that includes the first material;
  a connector portion coupled to an outer edge of the outer wall, wherein the outer wall includes an opening proximate to the connector portion, such that the connector portion and the outer wall include a contiguous space;
  a plurality of printed circuit boards (PCBs), wherein a particular PCB, of the plurality of PCBs, is coupled to the bottom cover by one or more metal nodes such that a first vertical space is formed between the particular PCB and the bottom cover, wherein the particular PCB extends through the opening and is situated partially within the connector portion; and
  an antenna, through which the particular PCB communicates with a wireless telecommunications network, wherein the antenna is positioned along a circumference of an inner portion of the outer wall and above the particular PCB to create a second vertical space between the antenna and the particular PCB,
    wherein the antenna includes a first antenna portion and a second antenna portion that are arranged separately along the circumference of the outer wall such that a gap exists between the first antenna portion and the second antenna portion, and
    wherein the first antenna portion and the second antenna portion are positioned within the inner core portion, below the bezel and not in contact with the bezel, and above the bottom cover.

19. The apparatus of claim 18, further comprising:
  a display coupled to the bezel.

20. The apparatus of claim 18, wherein the inner core portion of the apparatus further includes a display cover, coupled to a top most portion of the outer wall, defining a top most portion of the wearable device core.

* * * * *